H. S. MORTON.

AUTOMOBILE BRAKE ACTUATING MECHANISM.

APPLICATION FILED JAN. 11, 1915.

Reissued June 20, 1916.

14,155.

4 SHEETS—SHEET 1.

Witnesses:
Theo. Lagnard
H. A. Bourman.

Inventor:
Harold S. Morton.
By F. A. Whiteley
his Attorney.

H. S. MORTON.

AUTOMOBILE BRAKE ACTUATING MECHANISM.

APPLICATION FILED JAN. 11, 1915.

Reissued June 20, 1916.

14,155.

4 SHEETS—SHEET 2.

Witnesses:
Theo. Lagrard.
H. A. Bowman.

Inventor
Harold S. Morton.
By F. A. Whiteley
his Attorney.

H. S. MORTON.

AUTOMOBILE BRAKE ACTUATING MECHANISM.

APPLICATION FILED JAN. 11, 1915.

Reissued June 20, 1916.

14,155.

4 SHEETS—SHEET 3.

Witnesses:
Thos. Lagrard
H. A. Bowman

Inventor:
Harold S. Morton.
By F. A. Whiteley
his Attorney.

H. S. MORTON.

AUTOMOBILE BRAKE ACTUATING MECHANISM.

APPLICATION FILED JAN. 11, 1915.

Reissued June 20, 1916.

14,155.

4 SHEETS—SHEET 4.

Witnesses:
Theo. Lagaard
H. A. Bowman.

Inventor:
Harold S. Morton.
By F. A. Whiteley
his Attorney.

UNITED STATES PATENT OFFICE.

HAROLD S. MORTON, OF MINNEAPOLIS, MINNESOTA, ASSIGNOR TO MORTON BRAKE COMPANY, OF MINNEAPOLIS, MINNESOTA, A CORPORATION OF MINNESOTA.

AUTOMOBILE BRAKE-ACTUATING MECHANISM.

14,155. Specification of Reissued Letters Patent. Reissued June 20, 1916.

Original No. 1,104,066, dated July 21, 1914, Serial No. 735,633. Application for reissue filed January 11, 1915. Serial No. 1,688.

*To all whom it may concern:*

Be it known that I, HAROLD S. MORTON, a citizen of the United States, residing at Minneapolis, in the county of Hennepin and State of Minnesota, have invented certain new and useful Improvements in Automobile Brake-Actuating Mechanism; and I do hereby declare the following to be a full, clear, and exact description of the invention, such as will enable others skilled in the art to which it appertains to make and use the same.

My invention relates generally to brake mechanism for wheel vehicles, but is especially directed to the provision of an improved brake mechanism for automobiles.

More specifically stated, this invention has for its especial object the provision of a simple and efficient brake mechanism whereby the brake power may be simultaneously applied to all four wheels of an automobile or motor propelled vehicle, with the brake setting action properly proportioned between the front and rear wheels and without interfering with the steering movements of the front wheels. This is accomplished particularly by the provision of equalizing bars having direct connection from their ends with the brake-applying mechanism and each of said bars being connected at the center thereof with a system of equalizing levers.

The full objects and advantages of my invention will appear in connection with the detailed description thereof and are particularly pointed out in the claims.

Figure 1:
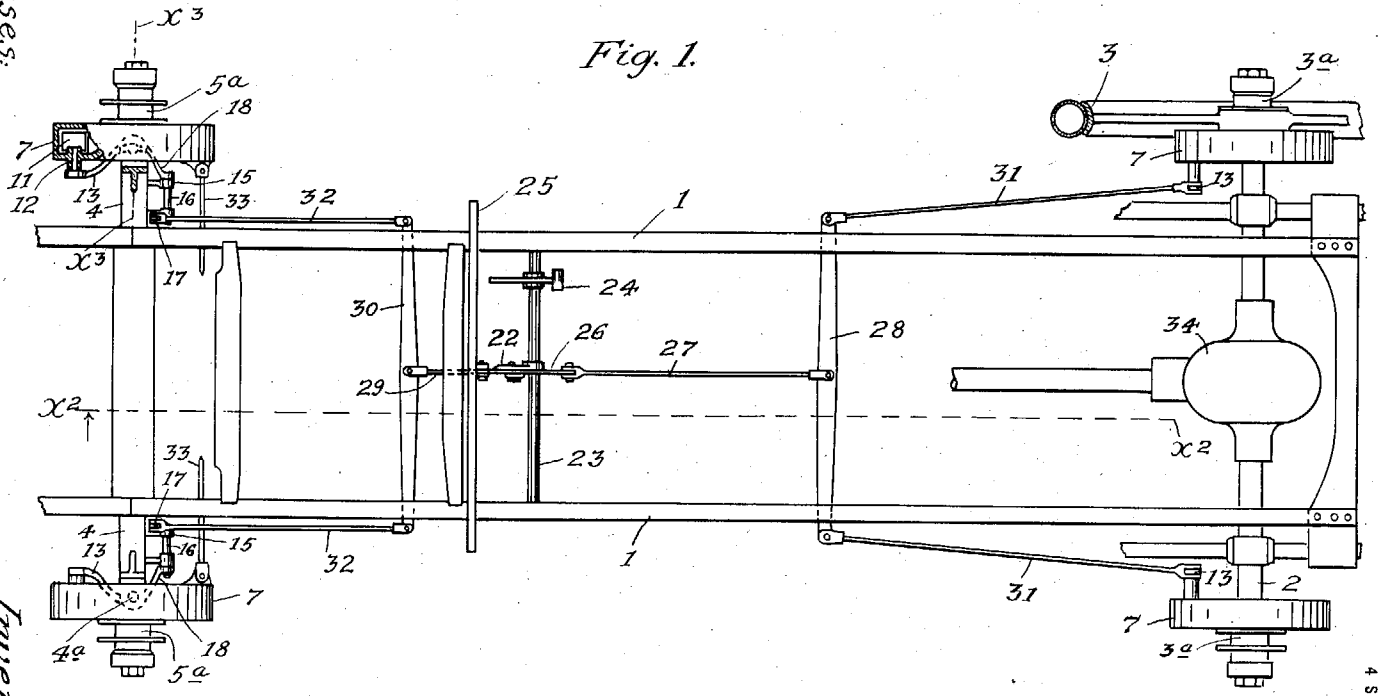
Figure 2:
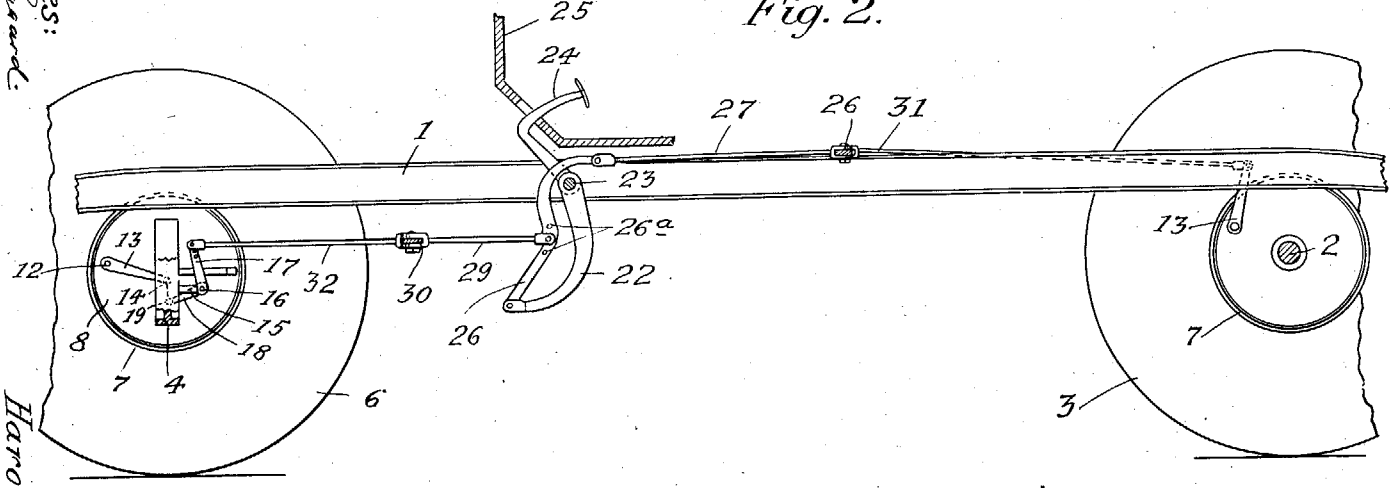
Figure 3:
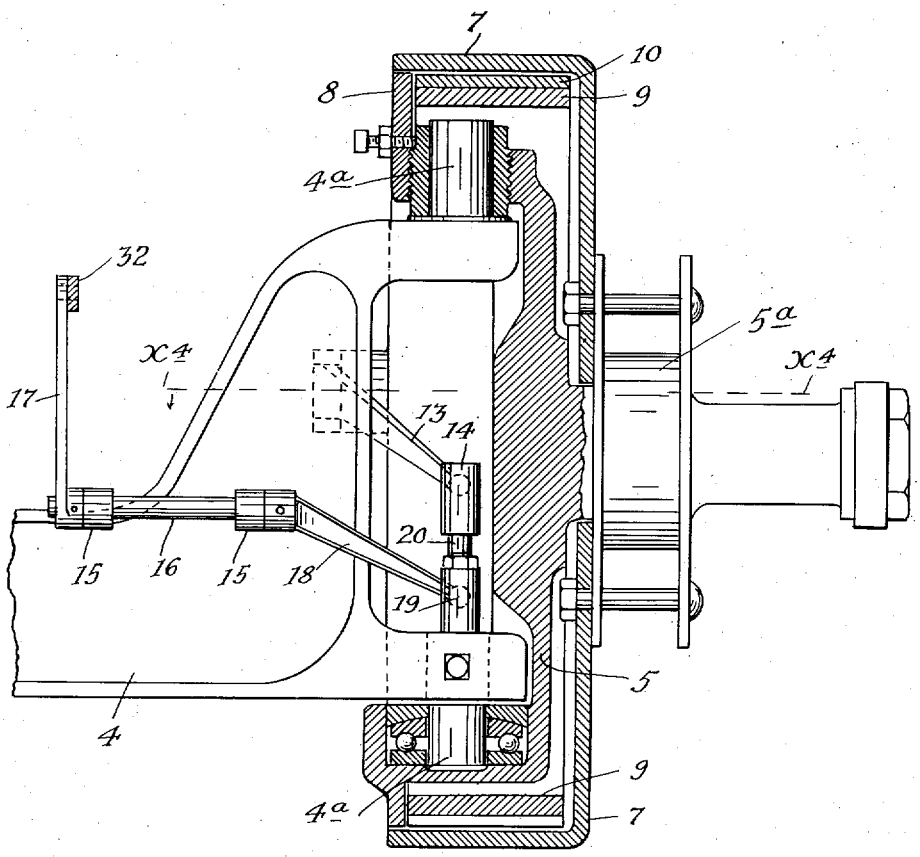
Figure 4:
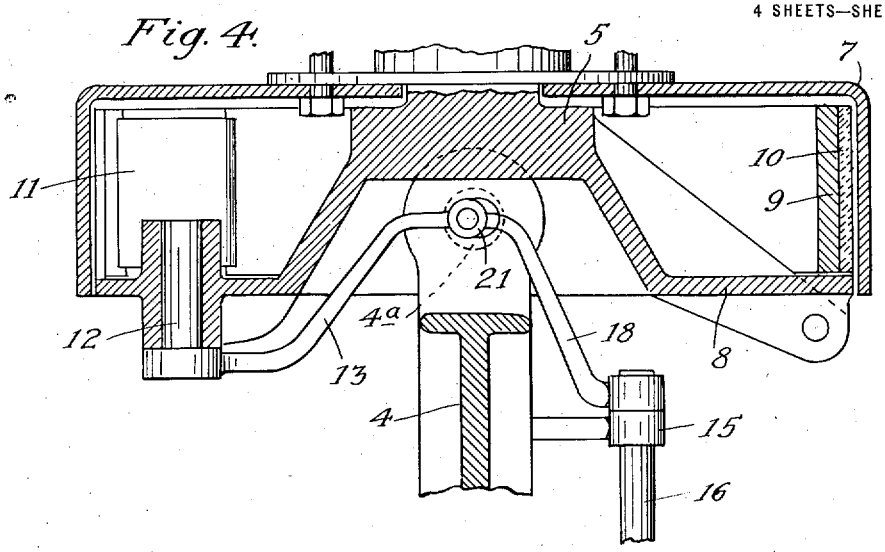
Figure 5:
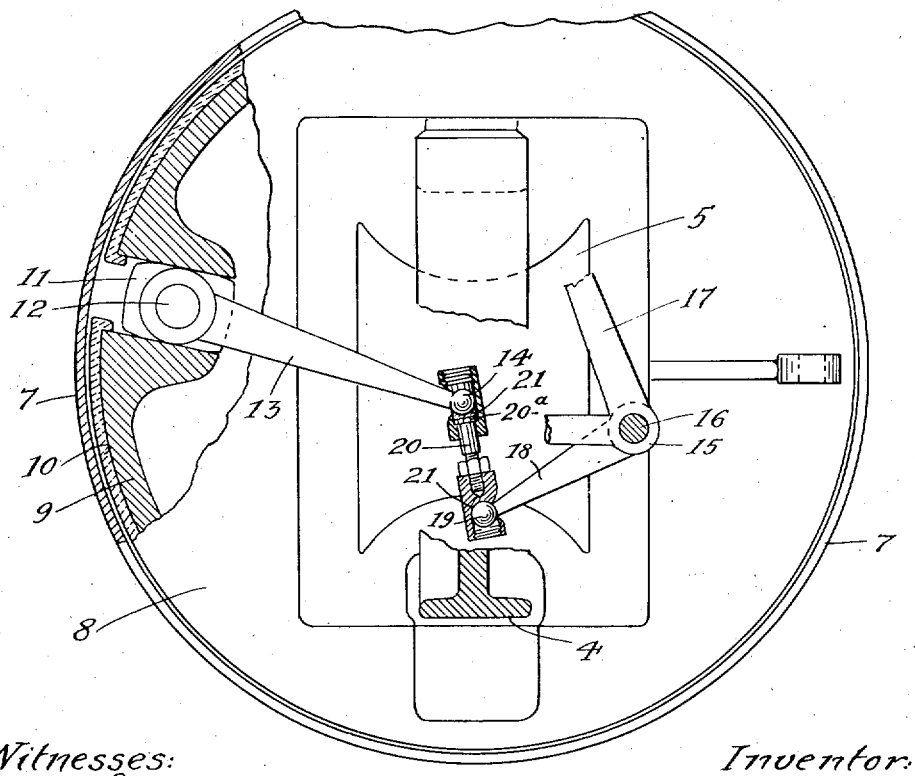

In the drawings, illustrating the application of my invention in one form,—Figure 1 is a plan view showing the improved brake mechanism applied to the chassis of an automobile, some parts being broken away and some parts being sectioned; Fig. 2 is a fragmentary view in vertical longitudinal section taken approximately on the line $x^2$ $x^2$ on Fig. 1, some parts being shown in diagram and some parts being removed; Fig. 3 is an enlarged vertical section taken approximately on the line $x^3$ $x^3$ on Fig. 1, some parts being shown in full; Fig. 4 is a horizontal section taken approximately on the line $x^4$ $x^4$ on Fig. 3; and Fig. 5 is a side elevation of the parts shown in Fig. 4, some parts being broken away and some parts being sectioned on various different section lines.

Of the standard parts of the chassis or running gear, the numeral 1 indicates the framework, the numeral 2 the rear axle, the numeral 3 the rear wheels, the numeral 4 the front axle having the pivoted knuckles 5, and the numeral 6 the front wheels. The hubs $3^a$ and $5^a$ of the rear and front wheels, respectively, are journaled in the customary way upon the trunnions of the knuckles 5, and all of these hubs, in this preferred arrangement, are provided with brake drums 7 having laterally projecting cylindrical flanges.

The ends of the rear axle 2 in the one instance, and the knuckles 5 of the front axle 4 in the other instance, are formed with disk-like flanges 8 that close the open inner sides of the brake drums 7. Working within each brake drum 7 and anchored to the corresponding knuckle flange 8, is a circumferentially expansible split brake band 9, the outer face of which is preferably provided with the usual leather, wood fiber or other pliable covering 10, for direct engagement of the inner surface of the coöperating brake drum. Pivoted to each knuckle flange 8 is a flattened head 11 that works between the ends of the brake band 9 and the projecting shaft or stem 12 of which has an arm 13 located inward of the coöperating drum 7 and knuckle flange 8. The brake band is expanded into contact with the coöperating brake drum, by pivotal movement of the flattened head 11, this being a well known form of friction brake or clutch.

The arms 13 of the rear wheel brakes extend upward, as shown in Fig. 2, but the arms 13 of the front wheel brakes extend radially inward, in respect to the coöperating brake drums, and terminate in spherical heads 14 having their centers located approximately at the intersecting points of the wheel hubs and of the alined vertical axes of the journals 4ª that pivotally connect the knuckles 5 to the front axle 4.

Journaled in suitable bearings 15 on the end portions of the front axle 4, are short horizontal shafts 16 having at their inner ends upwardly extended arms 17 and having at their outer ends arms 18 terminating in spherical heads 19 having their centers located approximately on the vertically projected line of the said knuckle journals 4ª. The said elements 16, 17 and 18, in effect, constitute bell cranks. The spherical heads 14 and 19 of the coöperating arms 13 and 18 are connected by short longitudinally adjustable links 20 having sockets 21 that directly engage with the said heads 14 and 19. The sockets 21 and the heads 14 and 19 afford joints having limited universal movements, and inasmuch as the centers of the said joints are located approximately in line with the vertical axes of the steering knuckles 5, it is evident that horizontal oscillatory movements of the said knuckles required to steer the machine, will not materially change the operative relation of the said connections. The centers of the heads 14 and 19, in the brake setting movements, of course, move on the arcs of circles, but their movements do not deviate much from the vertical line of the projected axes of the said trunnions 4ª. The universal joints readily take care of all such slight deviation. By reference particularly to Fig. 5, it will be noted that the link 20 has a swivel connection at 20ª, which relieves the link and other parts from torsional strains due to the steering movements imparted to the knuckles and front wheels.

In the arrangement illustrated, the four brakes are arranged to be simultaneously set from a common operating lever, as shown, in the form of a primary lever 22, secured to the transverse shaft 23, supported by the framework 1, and provided with a foot lever 24 that terminates above the foot board 25 of the vehicle body, a fragment of which is shown in Fig. 2. The free lower end of the lever 22 is pivoted to the lower end of a secondary lever 26. The free upper end of the lever 26 is connected by a rod 27 to the intermediate portion of a rear equalizing lever 28, while the intermediate portion of said lever 26 is connected by a rod 29 to the intermediate portion of a front equalizing lever 30. The ends of the rear equalizing lever 28 are connected by rods 31 to the upper ends of the rear brake levers 13, while the ends of the front equalizing lever 30 are connected by rods 32 to the upwardly extended arms 17 of the so-called bell cranks 16—17 and 18.

In Fig. 1, the numeral 33 indicates a cross bar which connects the steering knuckles 5 at the front axle for parallel movements. This connection 33 constitutes a part of the steering mechanism, not necessary for the purposes of this case to consider.

So far as this invention is concerned, the rear traction wheels may be driven by any suitable transmission mechanism, but in Fig. 1, I have diagrammatically indicated a gear and shaft casing 34 connected to the casing of the rear axle 2 and adapted for use in connection with a gear drive. As is evident, with the arrangement shown, when the foot is placed on the foot lever 24, and the upper end of this lever is pressed forward, all four of the brake bands 9 will be expanded and the brakes of all four wheels will be simultaneously set with the adjustment of levers and connecting rods shown in the drawings and best indicated in Fig. 2, the braking power will be applied with about equal force both to the front and to the rear wheels. The braking power on the front and rear wheels should, however, be proportioned as nearly as practicable to the load carried thereon, and frequently, it will be desirable therefore to apply considerably greater brake setting force to the rear wheels than to the front wheels. This adjustment may be provided for in different ways, but as shown, I have for this purpose provided a so-called secondary lever 26 with vertically spaced perforations 26ª, in any one of which the pin which connects said lever to the rod 29 may be inserted, at will. It is, of course, obvious that the front equalizing lever 30 equally distributes the brake setting force between the front wheels while the rear equalizing lever 28 equally distributes the brake setting force between the rear wheels. By this arrangement for simultaneously setting the brakes of all four wheels of the vehicle the best possible distribution of the brake-setting power is accomplished, and it is thereby made possible to bring the vehicle to a stop within the shortest possible distance after setting the brake, and this, too, without causing any of the wheels to slide. As a further result of this, therefore, a minimum wear on the tires, due to setting of the brakes, is effected.

I claim:

1. The combination with a four-wheeled vehicle and individual braking arms and brake bands applied to each of the wheels thereof, of means for simultaneously actuating all of said brake bands so that the power applied will be properly proportioned among the several brakes according to the braking action required, comprising an actuating lever pivotally mounted and adapted to be operated by the driver in a plane vertical with respect to the wheel base of the vehicle, a link connected at one end with said lever and also operative in a vertical plane, an equalizing lever on each side of said link extending transversely of the frame of the vehicle each of said equalizing levers having operative connection with the link at different points along the length thereof, and means operatively connecting the equalizing lever to the several brakes.

2. The combination with a four-wheeled vehicle and individual braking arms and brake bands applied to each of the wheels thereof, of means for simultaneously operating all of said brake bands so that the power will be properly proportioned among the several brakes according to the braking action required, comprising a primary brake-actuating lever pivotally mounted and adapted to be operated by the driver in a plane vertical with respect to the wheel base of the vehicle, a secondary brake-actuating lever having one end pivoted to one end of said primary lever, front and rear equalizing levers, operative connections from the respective ends of said equalizing levers to the corresponding front and rear brake bands, a member operatively connecting the intermediate portions of one of said equalizing levers to the intermediate portion of said secondary brake-actuating lever, and another member operatively connecting the free end of the latter to the intermediate portion of the other equalizing lever.

3. The combination with a four-wheeled vehicle having steering knuckles with the front wheels journaled on said knuckles, of individual brakes applied to the hubs of all four wheels, and means for simultaneously setting all of the said brakes, comprising front and rear equalizing levers, the rods connecting the ends of said front and rear equalizing levers, respectively, to the front and rear brakes, the said front brake connections including swivel joints located approximately in line with the vertical axes of the knuckle pivots, a primary brake actuating lever, a secondary brake actuating lever pivotally connected at one end to one end of said primary lever, a rod connecting one end of said secondary lever to the intermediate portion of one of said equalizing levers, and a rod connecting the intermediate portion of said secondary lever to the intermediate portion of the other equalizing lever.

4. The combination with the front wheel axle having a forked end and spindles secured to and extending outwardly from the members of said forked end, of a steering knuckle having portions extended to the outside of said forked ends and journaled upon the spindles, a wheel having its hub journaled on said steering knuckle, a brake drum fast on said wheel hub, a brake band fast on the steering knuckle and within but normally out of engagement with said brake drum, and means supported by the axle and including a floating connector member positioned between the ends of the axle fork in the line of said spindles operable when the drum and band are in any position relative to the axle by reason of oscillation of said steering knuckle to cause the brake band to engage the drum.

5. The combination with the front wheel axle having a forked end and spindles secured to and extending outwardly from the members of said forked end, of a steering knuckle having portions extended to the outside of said forked ends and journaled upon the spindles, a wheel having its hub journaled on said steering knuckle, a brake drum fast on said wheel hub, a brake band fast on the steering knuckle and within but normally out of engagement with said brake drum, and means supported by the axle and operable when the drum and band are in any position relative to the axle by reason of oscillation of said steering knuckle to cause the brake band to engage the drum, said brake band moving means including a link floating between the forked ends of the axle and extending substantially in the line of said spindles.

6. The combination with the forked end of a front wheel axle and spindles secured to and extending outwardly from the members of said forked end, of a steering knuckle having portions extended to the outside of said forked ends and journaled upon the spindles, a wheel having its hub journaled on said steering knuckle, a brake drum fast on said wheel hub, a brake band fast on the steering knuckle and within but normally out of engagement with said brake drum, means for actuating the brake band comprising a member journaled on the steering knuckle having an arm, a member journaled on the axle having an arm, the ends of said arms extending into the space between the axle fork, and a link connecting said ends and extending substantially in the line of said spindles.

7. The combination with the forked end of a front wheel axle and spindles secured to and extending outwardly from the members of said forked end, a steering knuckle having portions extended to the outside of said forked ends and journaled upon the spindles, a wheel having its hub journaled on said steering knuckle, a brake drum fast on said wheel hub, a brake band fast on the steering knuckle and within but normally out of engagement with said brake drum, means for actuating the brake band comprising a member journaled on the steering knuckle having an arm, a member journaled on the axle having an arm, the ends of said arms extending into the space between the axle fork, and a link connecting said ends and extending substantially in the line of said spindles, said link being formed in two sections having a swiveling connection to permit relative axial movement of the sections and each section being connected to its corresponding arm by a ball-and-socket joint.

In testimony whereof I have hereunto affixed my signature in the presence of two witnesses.

HAROLD S. MORTON.

Witnesses:
F. A. WHITELEY,
H. A. BOWMAN.